US006227262B1

United States Patent
Kohl et al.

(10) Patent No.: US 6,227,262 B1
(45) Date of Patent: May 8, 2001

(54) SYSTEM FOR MAKING A FLOOR CLEANING LIQUID AVAILABLE IN A CONVENIENT MANNER

(75) Inventors: Albert Kohl, Bern (CH); Jean-Claude Frezal, Limonest (FR); Jean-Marc Bortolotti, Grezieu-de-Varenne (FR); Michel Bertrand, Vitrolles-en-Luberon (FR); Fernand Alvaro, Bringnais (FR); Pierre Duffal, Chassieu (FR); Jean-Marc Giuliano, St. Maurcie-sur-Dargoire (FR)

(73) Assignee: Henkel Kommanditgesellschaft Auf Aktien, Duesseldorf (DE)

( * ) Notice: Subject to any disclaimer, the term of this patent is extended or adjusted under 35 U.S.C. 154(b) by 0 days.

(21) Appl. No.: 09/142,333

(22) PCT Filed: Feb. 25, 1997

(86) PCT No.: PCT/EP97/00889

§ 371 Date: Dec. 3, 1998

§ 102(e) Date: Dec. 3, 1998

(87) PCT Pub. No.: WO97/32513

PCT Pub. Date: Sep. 12, 1997

(30) Foreign Application Priority Data

Mar. 5, 1996 (DE) .............................................. 196 08 336
Jun. 17, 1996 (DE) .............................................. 196 24 053

(51) Int. Cl.[7] ........................................................ B65B 1/04
(52) U.S. Cl. .................................. 141/2; 141/9; 141/18; 141/100

(58) Field of Search .............................. 141/2, 9, 18, 100, 141/104, 105, 103; 222/145.5

(56) References Cited

U.S. PATENT DOCUMENTS

| 3,705,437 | 12/1972 | Rukavina, Jr. et al. | 15/302 |
|---|---|---|---|
| 3,747,155 | 7/1973 | Koellisch | 15/322 |
| 4,226,000 | 10/1980 | Tribolet | 15/321 |
| 4,321,219 | 3/1982 | Barker | 261/18 B |
| 4,938,421 | 7/1990 | Berfield et al. | 239/309 |
| 5,033,649 | * 7/1991 | Copeland | 222/132 |
| 5,584,327 | * 12/1996 | Thomas et al. | 141/9 |
| 5,765,605 | * 6/1998 | Waymire et al. | 141/9 |

FOREIGN PATENT DOCUMENTS

| 1 190 008 | 7/1985 | (CA) . |
|---|---|---|
| 38 43 491 | 12/1988 | (DE) . |
| 0 062 010 | 10/1982 | (EP) . |
| 0 173 392 | 3/1986 | (EP) . |

* cited by examiner

Primary Examiner—Steven O. Douglas
(74) Attorney, Agent, or Firm—Real J. Grandmaison; Wayne C. Jaeschke; Glenn E. J. Murphy

(57) ABSTRACT

An apparatus and process for filling the tank of an automatic floor-cleaning machine by providing a large capacity storage tank for a cleaning fluid, a reservoir for a concentrated cleaning agent, and a mobile floor-cleaning machine having a storage tank for a cleaning fluid wherein the apparatus is designed so that the floor-cleaning machine can be filled quickly by gravity.

22 Claims, 3 Drawing Sheets

SYSTEM FOR MAKING A FLOOR CLEANING LIQUID AVAILABLE IN A CONVENIENT MANNER

BACKGROUND OF THE INVENTION

1. Field of the Invention

This invention relates to a system for the preparation/distribution of a ready-to-use floor cleaning liquid comprising a preferably fixed, high-capacity storage tank for the preparation and/or storage of the floor cleaning liquid, a reservoir for a cleaning concentrate and a mobile automatic floor cleaner with a tank for the floor cleaning liquid.

2. Discussion of Related Art

Automatic floor cleaners for institutional use comprise tanks capable of holding up to 300 liters of cleaning liquid. In view of their large volume, the filling of these tanks through a tap from the water supply normally takes a considerable time, i.e. about 30 to 40 minutes, during which the floor cleaner is unavailable. Moreover, besides filling with water, cleaning product also has to be added in measured amounts which further complicates the filling process.

Accordingly, the object of the present invention was to provide a solution with which the filling of the particular liquid tanks of automatic floor cleaners could be considerably accelerated and simplified.

DESCRIPTION OF THE INVENTION

This object has been achieved by a system for the preparation/distribution of a ready-to-use floor cleaning liquid comprising a preferably fixed, high-capacity storage tank for the preparation and/or storage of the floor cleaning liquid, a reservoir for a cleaning concentrate and a mobile automatic floor cleaner with a tank for the floor cleaning liquid, characterized in that the storage tank comprises at least one liquid feed pipe designed for connection to a water supply and at least one liquid discharge pipe designed for connection to the tank of the automatic floor cleaner and communicates with a liquid connecting pipe to the reservoir; in that water flowing into a part of the liquid feed pipe or the storage tank and cleaning concentrate are intended to be mixed to form the floor cleaning liquid; in that the storage tank is mounted in a frame in such a way that an outflow opening thereof for the liquid discharge pipe is situated above the tank of the automatic floor cleaner and the flow of floor cleaning liquid from the storage tank into the tank of the automatic floor cleaner is induced solely by gravity; and finally in that the storage tank has a volume at least corresponding to the volume of the tank of the automatic floor cleaner and the dimensions of the outflow opening of the storage tank and the liquid discharge pipe are at least such that the filling time for the tank of the automatic floor cleaner is 0.5 to 4 minutes and preferably 1 to 2 minutes.

In the storage tank, therefore, the invention provides a reservoir of floor cleaning liquid from which the particular tank of the automatic floor cleaner can be filled as required with floor cleaning liquid in a very short time through the liquid discharge pipe. If, for example, a hose-like liquid discharge pipe with a cross-section of 50–80 mm is used, a filling time of only about 1–2 minutes is necessary, i.e. the filling time is considerably shortened in relation to the conventional method of direct filling from a water supply (about 30 to 40 minutes). In addition, the filling process is further simplified by the fact that the ready-to-use floor cleaning liquid is stored in the storage tank itself, i.e. no cleaning concentrate has to be mixed with the water during the actual filling of the particular automatic floor cleaner. The storage tank preferably comprises purely mechanical elements which are responsible for the inflow and outflow of the liquids prepared and/or stored in them. Accordingly, these elements and hence the storage tank do not have to be powered by electricity so that there is no need for inspection by authorized examiners.

In one advantageous embodiment, the liquid feed pipe opens into the storage tank through a valve unit which opens and closes automatically in dependence upon the filling level of the storage tank. The storage tank can thus be filled entirely automatically which simplifies handling accordingly. Whenever floor cleaning liquid is removed from the storage tank to fill an automatic floor cleaner, the storage tank is automatically refilled.

In one particularly advantageous embodiment which provides for fully automatic filling of the reservoir, the valve unit consists of an electromagnetic valve operatively connected by an electrical line to a sensor or electrical switching element which is disposed in the upper part of the storage tank to detect the highest filling level envisaged and, on contact with the floor cleaning liquid in the storage tank, releases an electrical pulse to the electromagnetic valve through the electrical line so that the valve opens or closes automatically in dependence upon the filling level in the storage tank. Whenever floor cleaning liquid is removed from the storage tank to fill an automatic floor cleaner, the storage tank is automatically refilled. The magnetic valve operatively connected to the sensor or the electrical switching element is provided for this purpose.

To allow direct and constant connection to a water supply system, another embodiment of the invention is characterized in that a return flow barrier is provided in the liquid feed pipe to prevent the floor cleaning liquid accommodated in the storage tank or the liquid feed line from entering the water supply system.

To achieve automatic preparation of the floor cleaning liquid, another advantageous embodiment of the invention is characterized in that an injector connected to the reservoir by the liquid connecting pipe is arranged downstream of the return flow barrier in the liquid feed pipe.

In a preferred variant of this embodiment, a replaceable nozzle is integrated in the liquid connecting pipe. The size of this nozzle determines the concentration of the cleaning solution (floor cleaning liquid) so that, simply by replacing the nozzle, the concentration of the cleaning solution can readily be changed as a function of the particular cleaning product used.

To achieve automatic preparation of the floor cleaning liquid, an alternative embodiment is characterized in that a pump connected to the reservoir by the liquid connecting pipe is arranged downstream of the return flow barrier in the liquid feed pipe.

In another embodiment of the invention, a nonreturn valve in the liquid feed pipe prevents dilute cleaning solution (floor cleaning liquid) from entering the reservoir for the cleaning concentrate.

Another embodiment of the invention, which provides for easier handling, is characterized in that the liquid discharge pipe is provided with a closure, for example in the form of a ball cock.

In a preferred embodiment of the invention, an overflow outlet is provided above the maximum permitted filling level of the storage tank. In the event of a fault in the valve unit or the sensor/valve system, this overflow outlet ensures that the storage tank does not overflow and, instead, guides the floor cleaning liquid into a drain.

In a particularly advantageous variant of this embodiment, the overflow outlet is positioned below the outlet opening of the liquid feed pipe. This additionally guarantees that no liquid is able to flow back into the water supply system.

DESCRIPTION OF THE DRAWINGS

The invention is described in more detail in the following with reference to the accompanying drawings, wherein.

Figure 1:
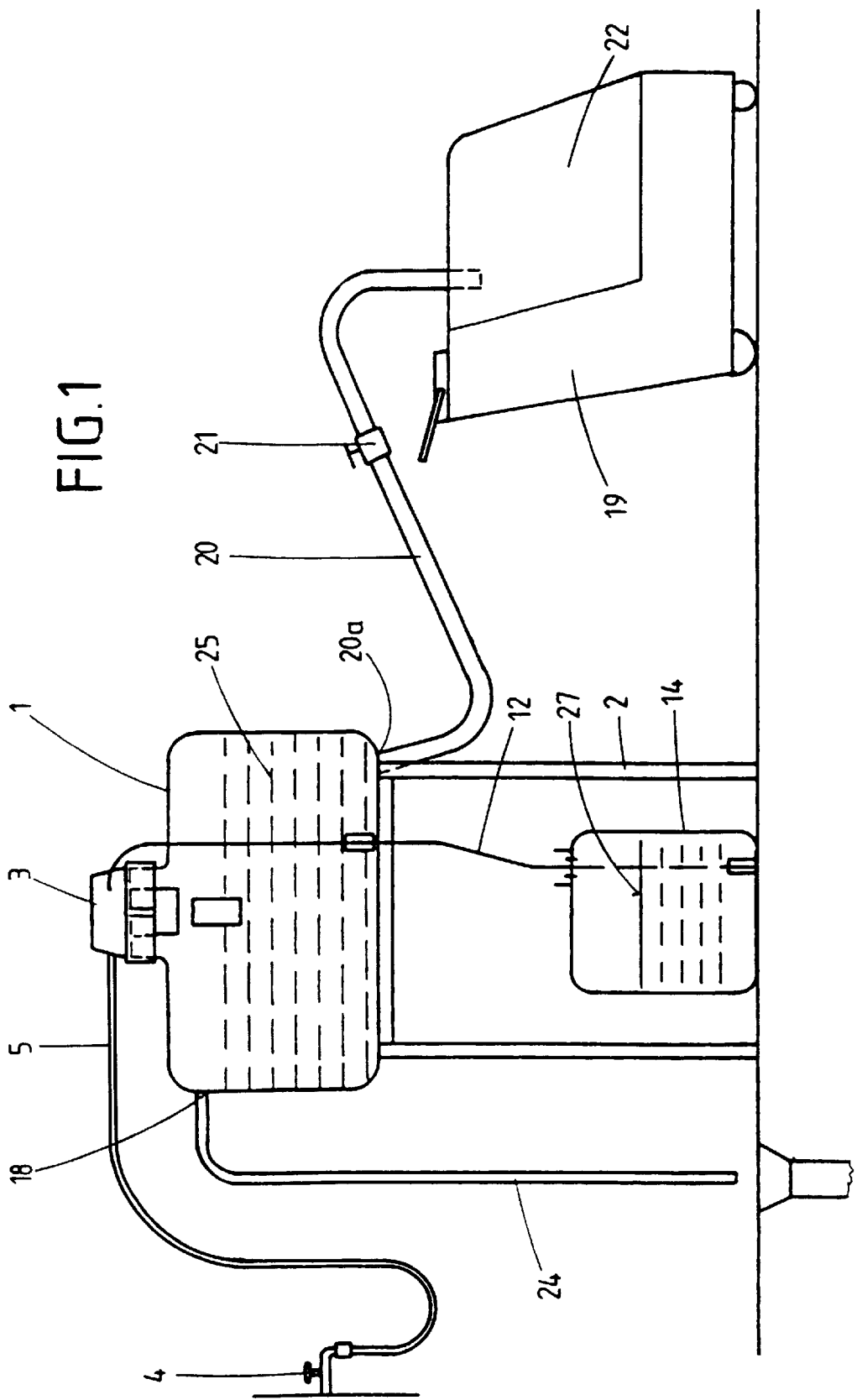
FIG. 1 is a side elevation of a first embodiment of a system according to the invention.

A first embodiment of a system according to the invention for the preparation/distribution of a ready-to-use floor cleaning liquid comprises a storage tank 1 which is provided with a liquid feed pipe 5 and a liquid discharge pipe 20. The storage tank 1 is fixed to a frame 2 and arranged at such a distance from the floor that the underneath of the storage tank and hence the tank outlet opening 20a of the liquid discharge pipe 20 is situated above the tank 22 of the automatic floor cleaner 19 to be filled with floor cleaning liquid 25 so that, whenever floor cleaning liquid 25 is removed from the storage tank 1 through the liquid discharge pipe 20, the flow of liquid into the tank 22 of the automatic floor cleaner 19 is induced solely by gravity.

At one end, the liquid feed pipe 5 is connected to a normal water supply system as symbolized by a water tap 4. The connection may be established by a normal hose coupling. The liquid feed pipe 5 opens into the storage tank 1 through a metering system generally denoted by the reference numeral 3 which is preferably mounted on the cover 1a of the storage tank 1.

The metering system 3 includes a valve unit generally denoted by the reference numeral 6 which is integrated in the feed pipe 5. The valve unit 6 consists of a modified electromagnetic valve. The usual magnetic coil is replaced by a bridge 7 with ring magnets which keep the valve open in the rest position. The bridge 7 is connected via a guide 8 to a float 9 which is disposed in the storage tank 1 and which floats on the liquid surface in the storage tank. When the filling level in the storage tank 1 is at its highest, the float 9 pushes the bridge 7 upwards and thus closes the valve. The valve unit 6 thus opens and closes automatically in dependence upon the filling level of the storage tank 1, so that the storage tank 1 is also automatically refilled with water from the water supply system.

Arranged downstream of the valve unit 6 in the liquid feed pipe 5 is a return flow barrier which, in the illustrated embodiment, is in the form of a pipe separator 10. The pipe separator 10 prevents floor cleaning liquid 25 flowing back from the storage tank 1 and that part of the liquid feed pipe 5 situated downstream of the return flow barrier 10 into the water supply system.

An injector 11 is arranged downstream of the return flow barrier 10 in the liquid feed pipe 5. The injector 11 is connected by a liquid connecting pipe 12 to a reservoir 14 for cleaning concentrate 27, a nonreturn valve 13 being integrated in the liquid connecting pipe 12. When liquid flows through the injector 11, cleaning concentrate 27 is taken in under suction from the reservoir 14 through the liquid connecting pipe 12 and mixed with the water in such a way that the mixed, ready-to-use floor cleaning liquid 25 flows into the storage tank from the free outflow 17 of the liquid feed pipe 5.

A plug-in coupling 15 with a replaceable nozzle 16 is preferably provided in the connecting pipe 12. The size of the nozzle 16 determines the concentration of the floor cleaning liquid. If this concentration is to be changed, for example when another cleaning concentrate is used, the nozzle 16 can be readily replaced.

The liquid feed pipe 5 opens into the reservoir 1 through the free outflow 17 downstream of the injector 11.

Disposed above the maximum filling level in the storage tank 1 is an overflow outlet 18 with an overflow hose 24 through which the floor cleaning liquid 25 is guided into a schematized drain in the event of nonfunctioning of the float system. As can be seen, the free outflow 17 of the injector 11 is situated above the overflow outlet which additionally ensures that no floor cleaning liquid 25 is able to flow back into the water supply (drinking water) system.

If the tank 22 for floor cleaning liquid 25 of an automatic floor cleaner 19 is to be filled with floor cleaning liquid 25, the free end of the liquid discharge pipe 20 is correspondingly introduced into the tank 22 of the automatic floor cleaner 19 and a closure 21 of the liquid discharge pipe 20 is subsequently opened, the closure preferably being formed by a ball cock. The floor cleaning liquid 25 then flows from the storage tank 1 into the liquid tank 22 of the automatic floor cleaner 19 solely under the effect of gravity. Where a liquid discharge pipe 20 with a cross-section of about 50 to 80 mm is used and the storage tank outflow opening 20a is correspondingly designed, a liquid tank of an automatic floor cleaner 19 with a holding capacity of about 200 liters can be completely filled in about 1 to 2 minutes.

Since the liquid level in the storage tank 1 falls during this filling process, the storage tank 1 is automatically refilled with water from the water supply system via the metering system 3 (sinking float 9) and the liquid feed pipe 5, cleaning concentrate 27 being added at the same time in the manner described above.

In the storage tank 1, the ready-to-use floor cleaning liquid 25 is prepared and stored before being introduced into the tank of the automatic floor cleaner 19 and made ready for use immediately afterwards.

Figure 3:
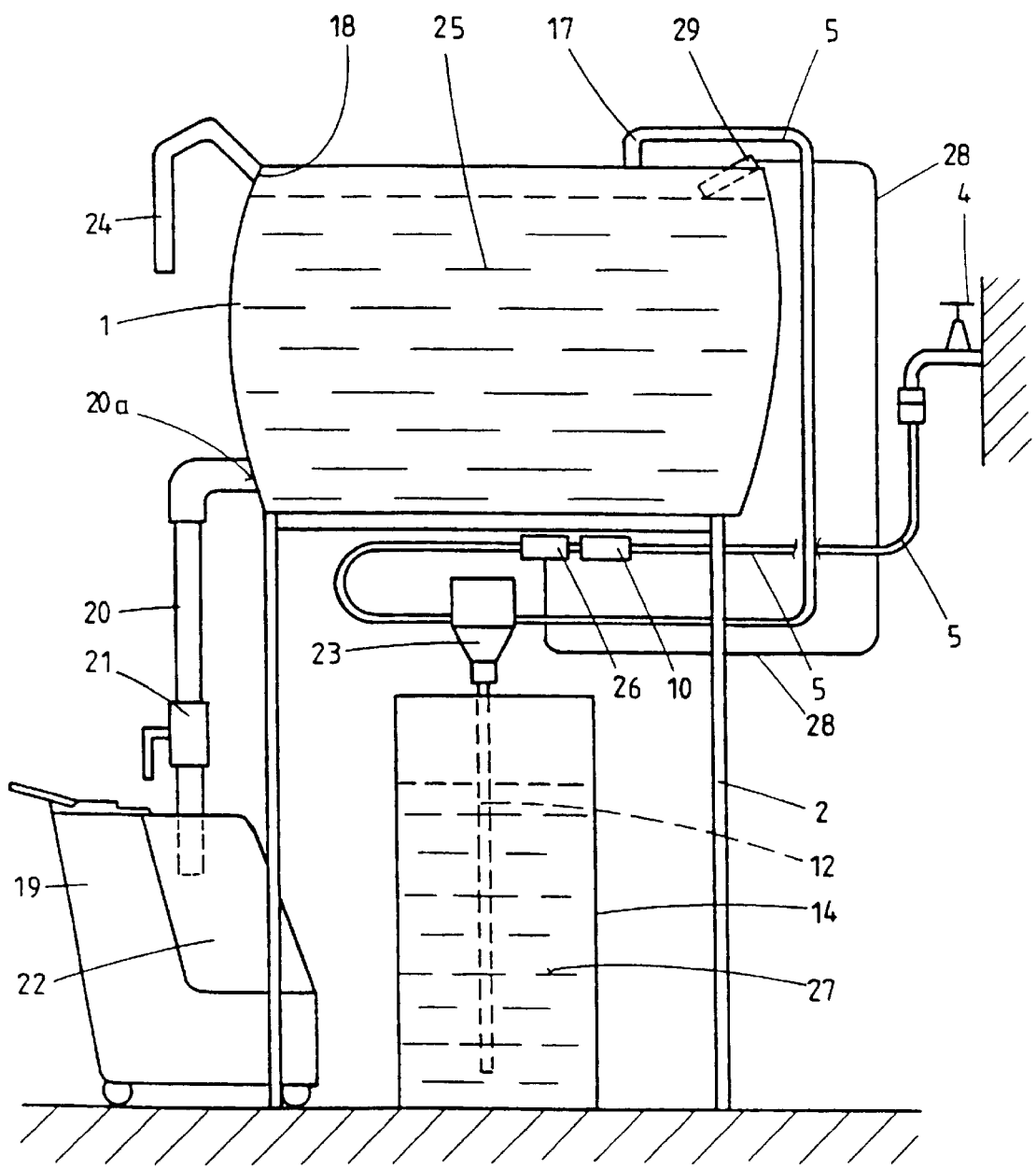
FIG. 3 schematically illustrates a second embodiment of a system according to the invention.

A second embodiment of a system according to the invention is illustrated in FIG. 3. The only difference in relation to the first embodiment lies in the manner in which water and cleaning concentrate 27 are mixed to form the floor cleaning liquid 25 and in which the storage tank 1 is automatically refilled.

Figure 2:
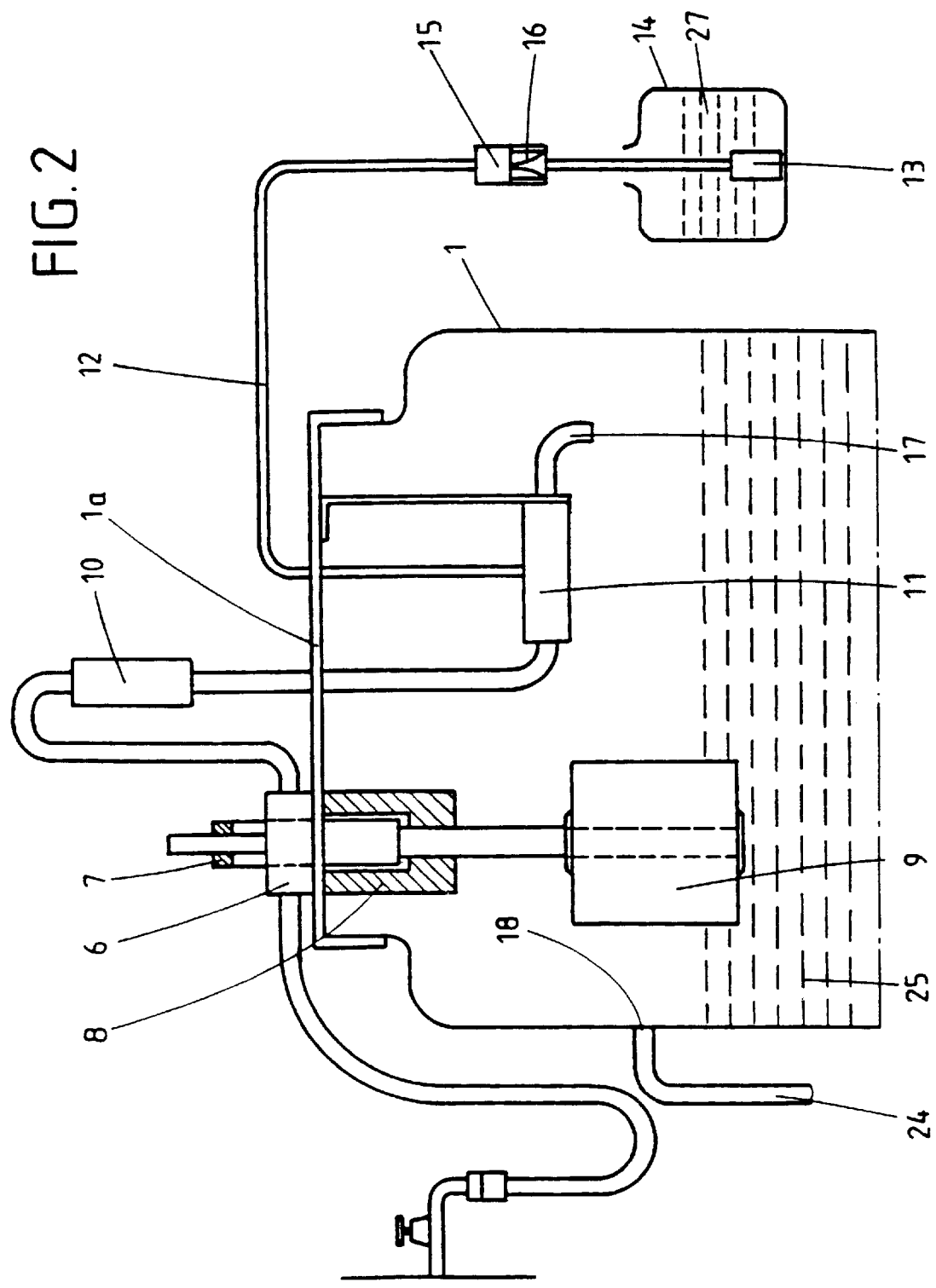
FIG. 2 shows part of the system illustrated in FIG. 1 on a larger scale.

Elements identical with or operating in the same way as elements described in reference to FIGS. 1 and 2 are denoted in the following by the same reference numerals.

The second system illustrated in FIG. 3 for preparing a ready-to-use floor cleaning liquid 25 in a tank 22 of an automatic floor cleaner 19 also comprises a storage tank with a holding capacity of about 300 liters which is provided with a liquid feed pipe 5 and a liquid discharge pipe 20. The storage tank 1 is fixed to a frame 2 and arranged at such a distance from the floor that the underneath of the storage tank and hence the tank outlet opening 20a of the liquid discharge pipe 20 is situated above the tank 22 of the automatic floor cleaner 19 to be filled with floor cleaning liquid so that, whenever floor cleaning liquid 25 is removed from the storage tank 1 through the liquid discharge pipe 20, the flow of liquid into the tank 22 of the automatic floor cleaner 19 is induced solely by gravity.

At one end, the liquid feed pipe is connected to a normal water supply system as symbolized by the tap 4. The connection may be established by a normal hose coupling. At its other end, the liquid feed pipe 5 opens into the storage tank 1. A metering system is provided in the liquid feed pipe 5.

This metering system includes an electromagnetic valve 26 integrated in the feed pipe 5. The electromagnetic valve 26 is connected by an electrical line 28 to a sensor or an electrical switching element 29 which is disposed in the upper part of the liquid storage tank 1 for detecting the highest filing level envisaged. When the filling level in the storage tank 1 is at its highest, the element 29 delivers an electrical pulse through the line 28 to the magnetic valve 26 and thus closes the valve. The valve 26 opens and closes automatically in dependence upon the filling level of the storage tank 1 so that the storage tank 1 is automatically refilled with water from the water supply system. The connection of the electromagnetic valve 26 to a voltage source is not shown.

A return flow barrier 10 is provided in the liquid feed pipe 5 upstream of the valve 26. This return flow barrier 10 in the form of a pipe separator prevents liquid from flowing back from the storage tank 1 into that part of the liquid feed pipe 5 situated downstream of the return flow barrier 10 and into the water supply system.

A pump 23 in the form of a proportional pump or volumetric pump is arranged in the liquid feed pipe 5 downstream of the return flow barrier 10 and the electromagnetic valve 26. The pump 23 is connected by the liquid connecting pipe 12 to a reservoir 14 for cleaning concentrate 27. A nonreturn valve (not shown) may be arranged in the liquid connecting pipe 12. Whenever water from the water supply system flows through the pump 23, cleaning concentrate 27 is taken in under suction from the reservoir 14 through the pipe 12 and mixed with the water in the liquid feed pipe 5. 0.5 to 4% by volume of cleaning concentrate is added. The required quantity added/volume added can be adjusted at the pump 23.

The liquid feed pipe 5 opens into the storage tank 1 through an outflow 17 downstream of the pump 23.

Arranged above the maximum permitted filling level in the storage tank 1 is an overflow outlet 18 with an overflow hose 24 through which the liquid is guided into a drain (not shown) in the event of nonfunctioning of the sensor/valve system 29,26. As can be seen, the outflow 17 of the pipe 5 is situated above the overflow outlet 18 which additionally ensures that no floor cleaning liquid 25 is able to flow back into the water supply (drinking water) system.

If the tank 22 for floor cleaning liquid 25 of an automatic floor cleaner 19 is to be filled with floor cleaning liquid 25, the free end of the liquid discharge pipe 20 is correspondingly introduced into the liquid tank 22 of the automatic floor cleaner 19 and a closure 21 of the liquid discharge pipe 22 is subsequently opened, the closure preferably being formed by a ball cock. The floor cleaning liquid then flows from the storage tank 1 into the liquid tank 22 of the automatic floor cleaner 19 solely under the effect of gravity. Where a liquid discharge pipe 20 with a cross-section of about 50 to 80 mm is used and the storage tank outflow opening 20a is correspondingly designed, a liquid tank of an automatic floor cleaner 19 with a holding capacity of about 150 liters can be completely filled in about 1 minute. The filling time for a 300 liter tank is about 2 minutes. A volumetric flow rate of about 200 l/min. is even possible (the same also applies to the first embodiment).

Since the liquid level in the storage tank 1 falls during this filling process, the storage tank 1 is automatically refilled with water from the water supply system via the sensor/valve system 29,26 and the liquid feed pipe 5, cleaning concentrate 27 being added at the same time by the pump 23 in the manner described above.

In this embodiment, too, the pump 23 may be replaced by an injector and associated nozzle in the liquid feed pipe. Whenever water flows through it, the injector takes in cleaning concentrate 27 under suction from the reservoir 14 via the liquid connecting pipe 12 on the principle of water jet pumps and mixes it with the water in the liquid feed pipe 5.

What is claimed is:

1. A process for filling the storage tank of an automatic floor-cleaning machine with a cleaning liquid comprising providing a fixed, large capacity storage tank for the preparation and storage of said cleaning liquid, providing a reservoir for a cleaning composition concentrate, providing a mobile automatic floor-cleaning machine having a storage tank for said cleaning liquid, providing said fixed storage tank with a feed pipe adapted for connection to a water supply and communicating with a liquid pipe connected to said reservoir to prepare said cleaning liquid, providing a discharge pipe from said fixed storage tank for said cleaning liquid located above said floor-cleaning machine and adapted for connection to the storage tank of said floor-cleaning machine whereby said cleaning liquid flows by gravity into the storage tank of said floor-cleaning machine, wherein said fixed storage tank has a volume at least corresponding to the volume of the storage tank of said floor-cleaning machine and the dimension of said discharge pipe is such that the filling time for the storage tank of said floor-cleaning machine is from 0.5 to 4 minutes.

2. A process as in claim 1 wherein said feed pipe is provided with a valve that opens and closes automatically depending upon the filling level of said fixed storage tank.

3. A process as in claim 2 wherein said valve comprises an electromagnetic valve operatively connected by an electrical line to a sensor or electrical switching element which is disposed in the upper part of said fixed storage tank to detect the highest determined filling level.

4. A process as in claim 1 wherein said feed pipe is provided with a back flow barrier.

5. A process as in claim 4 wherein an injector is connected by a liquid connecting pipe to said reservoir for said cleaning composition concentrate and is located downstream of said back flow barrier.

6. A process as in claim 4 including connecting a pump to said liquid connecting pipe wherein said pump is located downstream of said back flow barrier located in said feed pipe.

7. A process as in claim 1 wherein said liquid pipe connected to said reservoir is provided with a replaceable nozzle.

8. A process as in claim 1 including providing said liquid connecting pipe with a non-return valve disposed in said reservoir for said cleaning composition concentrate.

9. A process as in claim 1 wherein said discharge pipe is provided with a valve.

10. A process as in claim 1 wherein said fixed storage tank is provided with an overflow outlet located at the maximum filling level of said storage tank.

11. A process as in claim 10 wherein said overflow outlet is located below the outlet opening of said liquid feed pipe.

12. An apparatus for the distribution of a ready-to-use floor cleaning liquid comprising a fixed, high-capacity storage tank for the preparation and storage of the floor cleaning liquid, a reservoir for a cleaning concentrate, and a mobile automatic floor cleaning machine having with a tank for the floor cleaning liquid, wherein said storage tank comprises at least one liquid feed pipe designed for connection to a water supply and at least one liquid discharge pipe designed for connection to the tank of the automatic floor cleaning machine and which communicates with a liquid connecting pipe to said reservoir, whereby water flowing into a part of the liquid feed pipe or the storage tank and cleaning concentrate reservoir are intended to be mixed to form the floor cleaning liquid, said storage tank being mounted in a frame so that an outflow opening thereof for the liquid discharge pipe is situated above the tank of the automatic floor cleaning machine and the flow of floor cleaning liquid from the storage tank into the tank of said automatic floor cleaning machine is induced solely by gravity, said storage tank having a volume at least corresponding to the volume of the tank of the automatic floor cleaning machine and the dimensions of the outflow opening of said storage tank and said liquid discharge pipe are at least such that the filling time for the tank of said automatic floor cleaning machine is from 0.5 to 4 minutes.

13. An apparatus as in claim 12 wherein said liquid feed pipe opens into said storage tank through a valve unit which opens and closes automatically in dependence upon the filling level of said storage tank.

14. An apparatus as in claim 13 wherein said valve unit consists of an electromagnetic valve operatively connected by an electrical line to a sensor or electrical switching element which is disposed in the upper part of said storage tank to detect the highest filling level, and on contact with the floor cleaning liquid in said storage tank, releases an electrical pulse to said electromagnetic valve through said electrical line so that said electromagnetic valve opens and closes automatically in dependence upon the filling level in said storage tank.

15. An apparatus as in claim 13 wherein a return flow barrier is provided in said liquid feed pipe.

16. An apparatus as in claim 15 wherein an injector connected to said reservoir by said liquid connecting pipe is arranged downstream of said return flow barrier in said liquid feed pipe.

17. An apparatus as in claim 16 wherein a replaceable nozzle is integrated in said liquid connecting pipe.

18. An apparatus as in claim 13 wherein a pump connected to said reservoir by said liquid connecting pipe is arranged downstream of said return flow barrier in the liquid feed pipe.

19. An apparatus as in claim 13 wherein said liquid connecting pipe is provided with a nonreturn valve.

20. An apparatus as in claim 13 wherein said liquid discharge pipe is provided with a closure.

21. An apparatus as in claim 12 wherein an overflow outlet is provided above the maximum permitted filling level of said storage tank.

22. An apparatus as in claim 21 wherein said overflow outlet is positioned below the outlet opening of said liquid feed pipe.

* * * * *